(12) United States Patent
Chang

(10) Patent No.: US 12,555,428 B2
(45) Date of Patent: Feb. 17, 2026

(54) ACCESS SYSTEM FOR SMART LOCKER AND ACCESS METHOD THEREOF

(71) Applicant: Kai-Chieh Chang, Taipei (TW)

(72) Inventor: Kai-Chieh Chang, Taipei (TW)

(*) Notice: Subject to any disclaimer, the term of this patent is extended or adjusted under 35 U.S.C. 154(b) by 0 days.

(21) Appl. No.: 19/190,553

(22) Filed: Apr. 25, 2025

(65) Prior Publication Data

US 2025/0363844 A1  Nov. 27, 2025

(30) Foreign Application Priority Data

May 21, 2024 (TW) ................. 113118786

(51) Int. Cl.
*G07C 9/00* (2020.01)
*A47G 29/14* (2006.01)
*G06K 7/14* (2006.01)

(52) U.S. Cl.
CPC ....... *G07C 9/00309* (2013.01); *A47G 29/141* (2013.01); *G06K 7/1417* (2013.01); *G07C 9/00706* (2013.01); *G07C 9/00896* (2013.01); *A47G 2029/145* (2013.01); *G07C 2009/00333* (2013.01)

(58) Field of Classification Search
CPC ............ G07C 9/00309; G07C 9/00706; G07C 9/00896; A47G 29/141; G06K 7/1417

USPC ........................................................ 235/382
See application file for complete search history.

(56) References Cited

U.S. PATENT DOCUMENTS

| | | | |
|---|---|---|---|
| 2018/0030759 A1* | 2/2018 | Chanbonpin | E05B 65/0007 |
| 2021/0074100 A1* | 3/2021 | Kashi | G06Q 10/0836 |
| 2021/0279986 A1* | 9/2021 | Igein | H04W 4/024 |
| 2022/0012683 A1* | 1/2022 | Taylor | G07C 9/00896 |
| 2022/0375289 A1* | 11/2022 | Boston | G07C 9/00912 |
| 2025/0148857 A1* | 5/2025 | Ecton | G06Q 30/0633 |

\* cited by examiner

*Primary Examiner* — Michael G Lee
*Assistant Examiner* — David Tardif
(74) *Attorney, Agent, or Firm* — Chih Feng Yeh; Yongjean Consulting Inc.

(57) ABSTRACT

An access system for smart locker and an access method thereof are disclosed. In the system, a portable device reads a unique identification code of a locker, and then transmits the unique identification code and its own identification message to a remote host, the remote host verifies whether a user identity matches the designated locker, when the user identity matches the locker, the remote host generates and transmits a trigger signal to the portable device, the portable device triggers an electronic door lock of the locker to enter an unlocked state from a locked state, thereby achieving the technical effect of reducing the cost and setup limitations of a smart locker.

10 Claims, 5 Drawing Sheets

ACCESS SYSTEM FOR SMART LOCKER AND ACCESS METHOD THEREOF

CROSS-REFERENCE STATEMENT

The present application is based on, and claims priority from, TAIWAN Patent Application Serial Number 113118786, filed May 21, 2024, the disclosure of which is hereby incorporated by reference herein in its entirety.

BACKGROUND OF THE INVENTION

1. Field of the Invention

The present invention relates to an access system and an access method thereof, and more particularly to an access system for a smart locker and an access method thereof.

2. Description of the Related Art

In recent years, with the widespread adoption and rapid development of online shopping, various service providers, including post offices, convenience stores, and logistics companies, have introduced convenient storage and retrieval services, and lockers are the most common storage devices.

Generally, conventional lockers only provide key locks or password locks, which can only be opened by the person possessing keys or passwords. However, this method is only suitable when the same person is both placing and retrieving items, so it unsuitable for online shopping scenarios since keys and passwords are inconvenient to share with another person; besides, simply using keys or passwords also carries the risk of being duplicated or stolen. Therefore, the conventional locker suffers from low usability and security concerns.

In view of this, some companies have introduced a technical approach with a smart locker, which verifies a user identity through a server connection, thereby providing a user with an automated storage and retrieval service. However, this approach results in a high cost for lockers, for example, the locker must be equipped with network capabilities, a stable power supply, and powerful computing resources, so it leads to high costs and limitations in setup for a smart locker. Thus, to address this issue, ROC Patent Issue No. 1787704 discloses a system and method for a smart cabinet, which is powered by a mobile device and provides password-based authentication unlocking. In the system, a target smart cabinet is selected through a server and executes an encryption algorithm to generate a first authentication code based on an identification code of the selected smart cabinet, the first authentication code is transmitted to a user's mobile device. When a power device or the user's mobile device supplies power to the selected smart cabinet, the smart cabinet executes the same encryption algorithm to generate a second authentication code based on its own identification code, and when the first authentication code matches the second authentication code, the electronic lock is controlled to unlock, thereby achieving the technical effect of improving the usability and setup convenience of the smart cabinet. In other words, in this approach, the smart cabinet (also called smart locker) is not equipped with a network or power supply, and it relies on a mobile device for connectivity and power. The smart cabinet then executes an encryption algorithm to generate an authentication code, which is compared with the received authentication code to determine whether to unlock the smart cabinet based on a comparison result. However, since each smart cabinet must have the computing capability to execute the encryption algorithm, the construction cost cannot be effectively reduced. Furthermore, because the encryption algorithm executed by the smart cabinet and the server must be the same, this increases management complexity and costs, for example, when the server updates the encryption algorithm, all smart cabinets must also be updated together, but the smart cabinets do not have network or power capabilities, remote updates are not feasible. Instead, personnel must be dispatched to each smart cabinet's physical location to perform the update, and this results in high labor costs.

In summary, what is needed is to develop an improved solution to solve the problem of high costs and setup limitations for a smart locker.

SUMMARY OF THE INVENTION

An objective of the present invention is to disclose an access system for smart locker and an access method thereof.

To achieve the objective, the present invention discloses an access system for a smart locker, the access system includes a plurality of lockers and a remote host, each of the plurality of lockers includes a cabinet, an electronic door lock, a motherboard, and a transmission line. The cabinet has a door panel that allows opening and closing. The electronic door lock is disposed on the door panel, wherein the electronic door lock is in a locked state when the electronic door lock is not powered and the door panel is closed. The motherboard is disposed in the cabinet and has a unique identification code, and is electrically connected to the electronic door lock through a conductive wire.

The transmission line is electrically connected to the motherboard, and configured to electrically connect to a portable device, wherein when electrically connected to the portable device, the portable device reads the unique identification code for transmission through a network, and the transmission line receives a trigger signal from the portable device to drive the electronic door lock to switch to an unlocked state from the locked state.

a remote host includes a non-transitory computer readable media and a hardware processor. The non-transitory computer readable media is configured to store computer-readable instructions. The hardware processor is electrically connected to the non-transitory computer readable media, and configured to execute the computer-readable instructions to make the hardware processor execute operations of: transmitting a designated compartment message to the portable device; when the portable device is electrically connected to the locker, receiving the unique identification code and an identification message transmitted by the portable device through a network; verifying a user identity based on the unique identification code and the identification message, and when the user identity is valid, generating and transmitting the trigger signal to the portable device to enable the portable device to trigger the electronic door lock to unlock the locker based on the trigger signal.

The present invention further discloses an access method for a smart locker, include steps of: providing a plurality of lockers, wherein each of the plurality of lockers comprises a cabinet, a motherboard, and a transmission line, the cabinet has a door panel that allows opening and closing, and an electronic door lock disposed on the door panel, the electronic door lock is in a locked state when the electronic door lock is not powered and the door panel is closed, the motherboard has a unique identification code and electrically connected to the electronic door lock through a conductive wire; transmitting a designated compartment message to a portable device, by a remote host; when the portable device is electrically connected to the locker through a transmission line, reading the unique identification code from the locker, and transmitting the read unique identification code and identification message to the remote host through a network, by the connected portable device; verifying the user identity based on the received unique identification code and the identification message, and when the user identity is valid, generating and transmitting a trigger signal to the portable device, by the remote host; triggering the electronic door lock based on the received trigger signal to switch the state of the portable device from the locked state to an unlocked state, by the portable device.

According to the above-mentioned system and method of the present invention, the difference between the present invention and the conventional technology is that, in the present invention, the portable device reads the unique identification code of the locker, and then transmits the unique identification code and its own identification message to the remote host, the remote host verifies whether the user identity matches the designated locker; when the user identity matches the locker, the remote host generates and transmits the trigger signal to the portable device, the portable device triggers the electronic door lock of the locker to enter the unlocked state from the locked state.

With the above-mentioned solution, the present invention can achieve the technical effect of reducing the cost and setup limitations of a smart locker.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
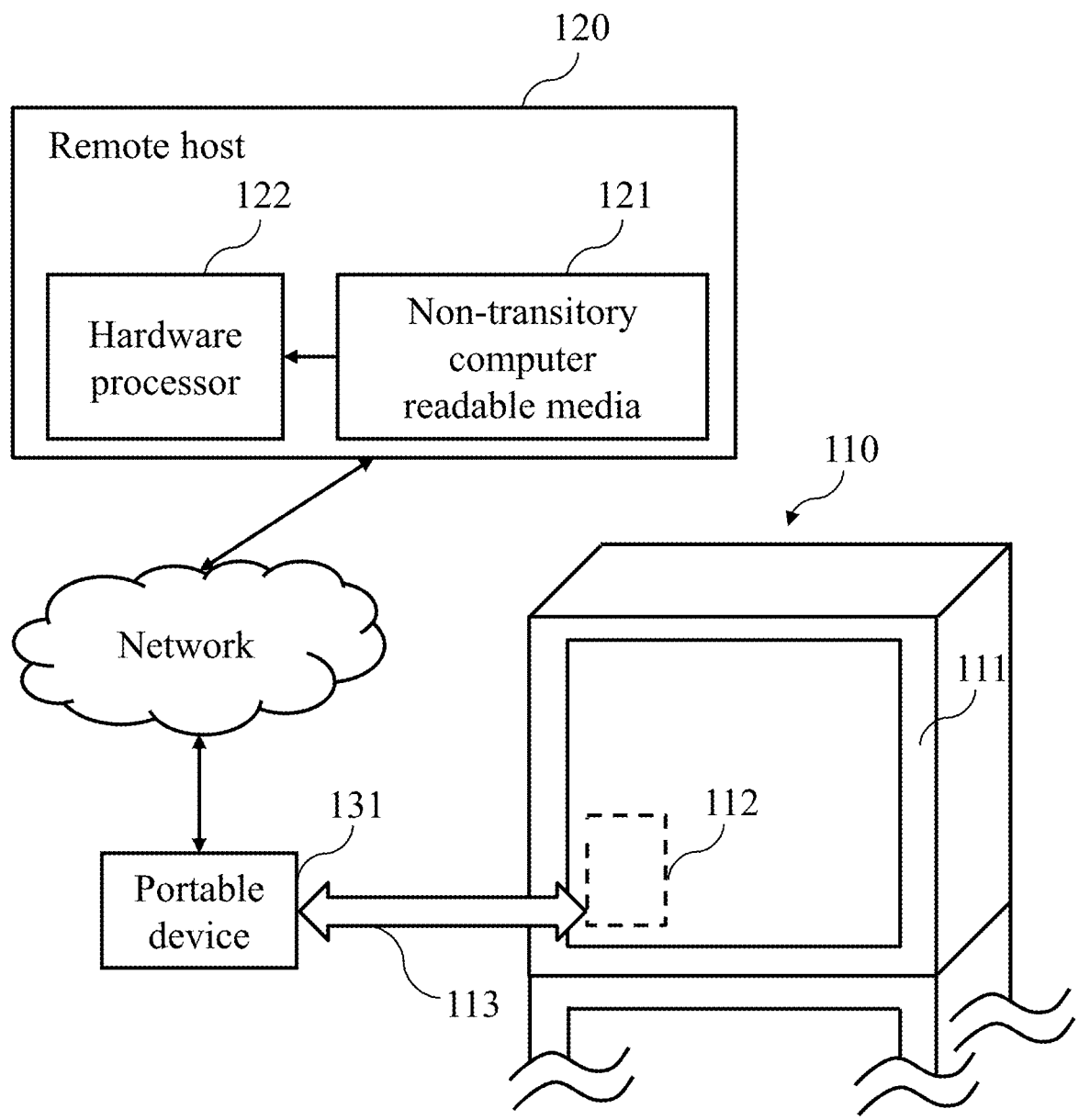
FIG. 1 is a block diagram of an access system for a smart locker, according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions, and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a," "an" and "the" are intended to include the plural forms as well, unless the context clearly indicates otherwise.

It is to be acknowledged that, although the terms "first," "second," "third," and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include," and variations such as "comprises," "comprising," "includes," or "including," will be acknowledged to imply the inclusion of stated elements but not the exclusion of any other elements.

Before explaining the disclosed access system for a smart locker and an access method thereof, the terminology defined in the present invention will be described. The locker mentioned in the present invention refers to a smart locker that does not provide any power on its own, and it can be electrically connected to a portable device (such as a smartphone, or a tablet computer) via a transmission line, and the portable device supplies power to the locker; or a mobile power source can be used to supply power to the smart locker. When the locker receives power from the portable device, the locker allows the portable device to read a unique identification code and transmit a trigger signal to drive the electronic door lock, and the operation will be explained in detail later with embodiments and diagrams. Additionally, the remote host in the present invention refers to a server that can assign a locker to a specific user for item placement or retrieval. When the user is a placer, the remote host assigns one of unused lockers to the placer. When the user is the retriever, the remote host assigns the corresponding locker to the retriever. User identification is carried out through an identification number, a cellphone number, an email address, and other message with uniqueness and identifiability, and at least one of cellphone number and email address can be used for contact.

The access system for smart locker and the access method thereof will be explained in the following paragraphs with reference to the diagrams. Please refer to FIG. 1. FIG. 1 is a block diagram of an access system for smart locker, according to the present invention. The access system includes a plurality of lockers 110 and a remote host 120. Each of the plurality of lockers includes a cabinet 111, a motherboard 112, and a transmission line 113, the cabinet 111 has a door panel that allows opening and closing, the door panel is equipped with an electronic door lock, the electronic door lock is in a locked state when the electronic door lock is not powered and the door panel is closed, such as a cathode lock. In other words, when the electronic door lock is not powered and the door panel is closed, the locker 110 cannot be opened; however, when powered, the electronic door lock can be opened via a trigger signal. Additionally, to prevent the door panel from failing to close onto the cabinet 111, an automatic return hinge can be installed between the door panel and the cabinet 111, so that the door panel can be automatically closed onto the cabinet 111 when no force is applied. Furthermore, in actual implementation, the door panel can have a through hole, the transmission line 113 can pass through the through hole, or a port connected to the motherboard 112 may be installed in the through hole for the transmission line 113 to connect electrically.

The motherboard 112 is installed inside the cabinet 111 and has a unique identification code, the motherboard 112 is electrically connected to the electronic door lock through a conductive wire. In actual implementation, the unique identification code has a unique string of text, numbers, symbols, or a combination thereof, and is stored in a storage component (such as memory or a similar device) on the motherboard 112. Additionally, the conductive wire can include, but not limited to, a copper wire, an aluminum wire, a brass wire, titanium wire or alloy wire. The conductive wire serves to transmit the trigger signal received by the locker 110 to the electronic door lock.

The transmission line 113 is electrically connected to the motherboard 112 and allows electrical connection with the portable device. When the portable device is electrically connected to the motherboard 112, the portable device reads the unique identification code and transmits unique identification code via the network, the transmission line 113 receives the trigger signal from the portable device to drive state of the electronic door lock to switch to an unlocked state from the locked state. In actual implementation, the transmission line 113 conforms to the supplementary standard (On-The-Go, OTG) of the Universal Serial Bus (USB), so that an OTG-supported portable device can be switched to a USB host mode and function as a USB peripheral device, and it has the capability for reverse power supply, that is, an portable device supporting OTG can provide power to the locker 110 supporting OTG. Besides, the transmission line 113 enables data transmission between the locker 110 and the portable device. It is particularly noted that, the portable device performs vectorization and four arithmetic operations on the read unique identification code and the identification message to generate a calculated value, this allows the remote host 120 to confirm whether the user identity is valid based on the calculated value, further examples will be provided with diagrams. Additionally, in actual implementation, the portable device can have a two-dimensional barcode scanning function; when the portable device is electrically connected to the motherboard 112 via the transmission line 113, the portable device can function as a scanning device for the locker 110 and obtain the trigger signal to trigger the electronic door lock through scanning two-dimensional barcode. It is particularly noted that the two-dimensional barcode is merely used as an example above and the present invention is not limited to this example, any method of obtaining the trigger signal directly or indirectly via the connected portable device remains within the scope of the present invention. For direct acquisition of the trigger signal, wired or wireless transmission of the trigger signal can be used. For indirect acquisition, a specific text, symbol, numerical value, or a combination thereof can be embedded into the two-dimensional barcode as the trigger signal. When the portable device scans the two-dimensional barcode, the portable device can obtain the trigger signal. Another example of indirect acquisition is embedding a URL into the two-dimensional barcode so that the portable device can be guided to establish a connection with a remote device (such as the remote host 120) to obtain the trigger signal. In practice, besides using the two-dimensional barcode as described above, one-dimensional barcodes or specific images can also be used, and biometric verification such as voiceprints, fingerprints, or other biometric features can even be integrated to trigger the electronic door lock.

The remote host 120 includes a non-transitory computer readable media 121 and a hardware processor 122. The non-transitory computer readable media 121 is configured to store computer-readable instructions. In practice, the non-transitory computer readable media 121 can be a tangible apparatus for holding and storing the instructions executable of an instruction executing apparatus. The non-transitory computer readable media 121 can be, but not limited to electronic storage apparatus, magnetic storage apparatus, optical storage apparatus, electromagnetic storage apparatus, semiconductor storage apparatus, or any appropriate combination thereof. More particularly, the non-transitory computer readable media 121 can include a hard disk, an RAM memory, a read-only-memory, a flash memory, an optical disk, a floppy disc, or any appropriate combination thereof, but this exemplary list is not an exhaustive list. The computer readable media is not interpreted as the instantaneous signal such a radio wave or other freely propagating electromagnetic wave, or electromagnetic wave propagated through waveguide, or other transmission medium (such as optical signal transmitted through fiber cable), or electric signal transmitted through electric wire. Furthermore, the computer readable program instruction can be downloaded from the non-transitory computer readable media 121 to each calculating/processing apparatus, or downloaded through network, such as internet network, local area network, wide area network and/or wireless network, to external computer equipment or external storage apparatus. The network includes copper transmission cable, fiber transmission, wireless transmission, router, firewall, switch, hub, and/or gateway. The network card or network interface of each calculating/processing apparatus can receive the computer readable program instructions from network, and forward the computer readable program instruction to store in non-transitory computer readable media 121 of each calculating/processing apparatus. The computer program instructions for executing the operation of the present invention can include source code or object code programmed by assembly language instructions, instruction-set-structure instructions, machine instructions, machine-related instructions, micro instructions, firmware instructions or any combination of one or more programming language. The programming language include object-oriented programming language, such as Common Lisp, Python, C++, Objective-C, Smalltalk, Delphi, Java, Swift, C#, Perl, Ruby, and PHP, or regular procedural programming language such as C language or similar programming language.

The hardware processor 122 is electrically connected to the non-transitory computer readable media 121 and configured to execute the computer-readable instructions to make the hardware processor 122 execute the following operations. The hardware processor 122 transmits the designated compartment message to the portable device; when the portable device is electrically connected to the locker 110, the remote host 120 receives the unique identification code and an identification message transmitted by the portable device through a network; the remote host 120 verifies an user identity based on the unique identification code and the identification message, when the user identity is valid, the remote host generates and transmits the trigger signal to the portable device, to enable the portable device to trigger the electronic door lock to unlock the locker 110 based on the received trigger signal. In actual implementation, the hardware processor 122 can be implemented by an integrated circuit chip, a system on chip (SoC), a complex programmable logic device (CPLD), or a field programmable gate array (FPGA). It is particularly noted that the remote host 120 generates an authorization message based on the designated compartment message and a cellphone number of the portable device, and transmit the authorization message to the portable device, when the authorization message matches the portable device and the locker 110 electrically connected thereto, the portable device is authorized to transmit the read unique identification code and the identification message to the remote host 120 through a network. In other words, only portable device that has obtained authorization message can transmit data to the remote host 120; the portable device that has not obtained the authorization message cannot transmit data to the remote host 120, or even if it does, the data will be discarded by the remote host 120. Additionally, the identification message can include an identification number, a cellphone number, an email address, and other information with uniqueness and identifiability, when the remote host 120 detects that the same portable device repeatedly transmit the same unique identification code and identification message within a predefined time segment (e.g., five minutes), the remote host 120 allows the regeneration of the trigger signal; when it exceeds the time segment, the remote host 120 prohibits further generation of the trigger signal until the locker 110 is unlocked by another portable device. In other words, the trigger signal is repeatedly generated within the predefined time segment to open the locker 110, to prevent the accidental closure of the door panel before items are placed in or retrieved. It is particularly noted that, as mentioned earlier, only portable device that has obtained authorization message can transmit data to the remote host 120, in actual implementation, the remote host 120 can verify whether the portable device is authorized by scanning a two-dimensional barcode (QR code). Similarly, when the portable device receives the trigger signal, the portable device can also convert the trigger signal into the two-dimensional barcode for display on the screen, so that a scanning device connected to the locker 110 can scan the two-dimensional barcode, thereby triggering the electronic door lock of the locker 110 to switch the state of the portable device from the locked state to an unlocked state; or even the two-dimensional barcode can be printed and directly provided for scanning by a scanning device (such as a portable device with scanning capability). The two-dimensional barcode can contain a uniform resource identifier (URI), a unique identification code, and an identification message (such as a password).

It should be supplemented that the data transmitted between the smartphone and the locker 110, such as unique identification code, designated compartment message, and identification message, can be processed through encryption/encoding methods, to maintain data security. For encryption, symmetric or asymmetric encryption is used; for encoding, methods such as secure hash algorithm (SHA) and message-digest algorithm 5 (MD5) are used.

Figure 2A:
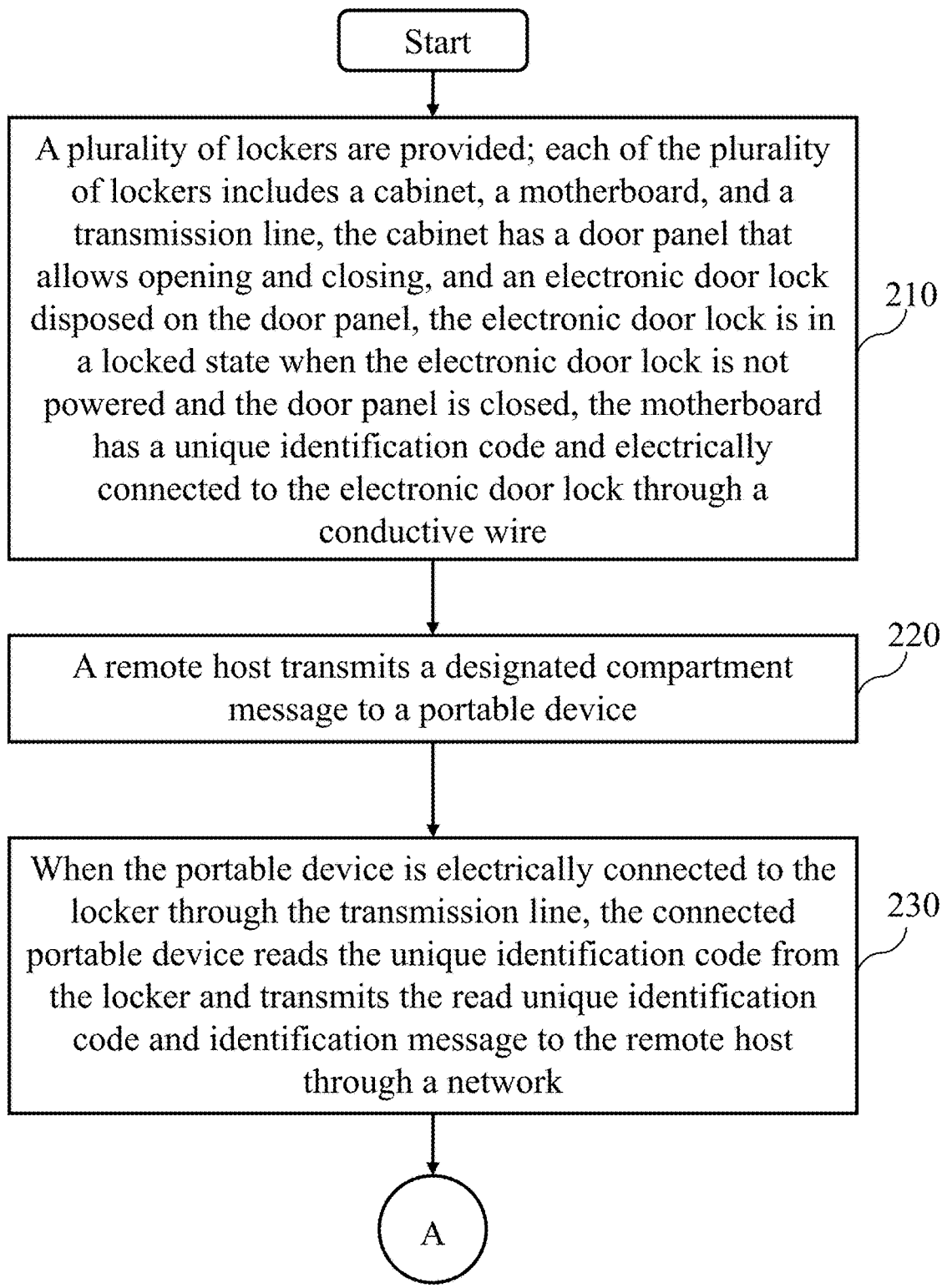
FIG. 2A and FIG. 2B are flowcharts of an access method for a smart locker, according to the present invention.
Figure 2B:
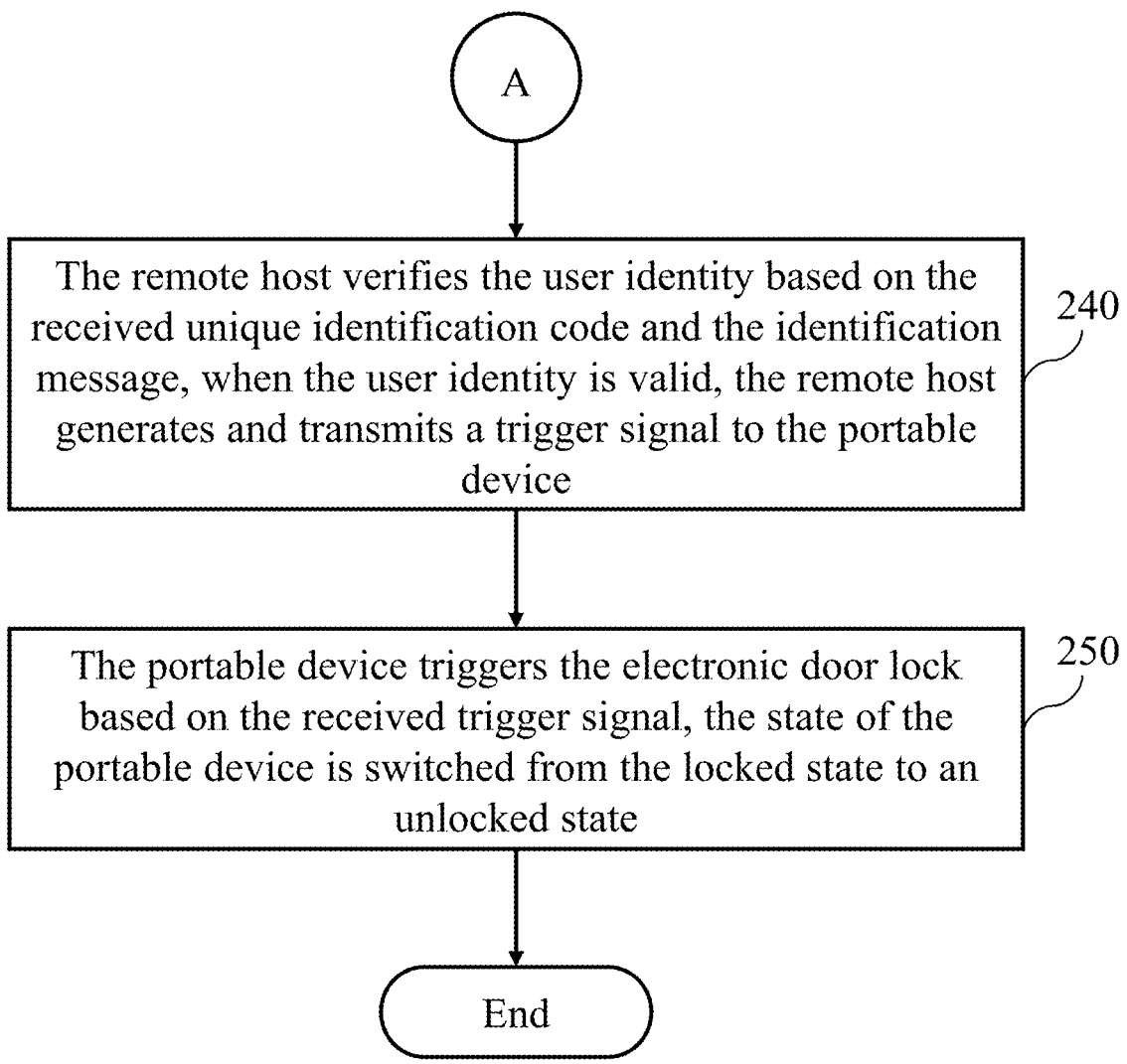

Please refer to FIG. 2A and FIG. 2B. FIG. 2A and FIG. 2B are flowcharts of an access method for smart locker, according to the present invention. The access method includes the following steps. In a step 210, a plurality of lockers 110 are provided; each of the plurality of lockers 110 includes a cabinet 111, a motherboard 112, and a transmission line 113, the cabinet 111 has a door panel that allows opening and closing, and an electronic door lock disposed on the door panel, the electronic door lock is in a locked state when the electronic door lock is not powered and the door panel is closed, the motherboard 112 has a unique identification code and electrically connected to the electronic door lock through a conductive wire. In a step 220, a remote host 120 transmits a designated compartment message to a portable device. In a step 230, when the portable device is electrically connected to the locker through the transmission line 113, the connected portable device reads the unique identification code from the locker and transmits the read unique identification code and identification message to the remote host 120 through a network. In a step 240, the remote host 120 verifies the user identity based on the received unique identification code and the identification message, when the user identity is valid, the remote host 120 generates and transmits a trigger signal to the portable device. In a step 250, the portable device triggers the electronic door lock based on the received trigger signal, the state of the portable device is switched from the locked state to an unlocked state.

Figure 3:
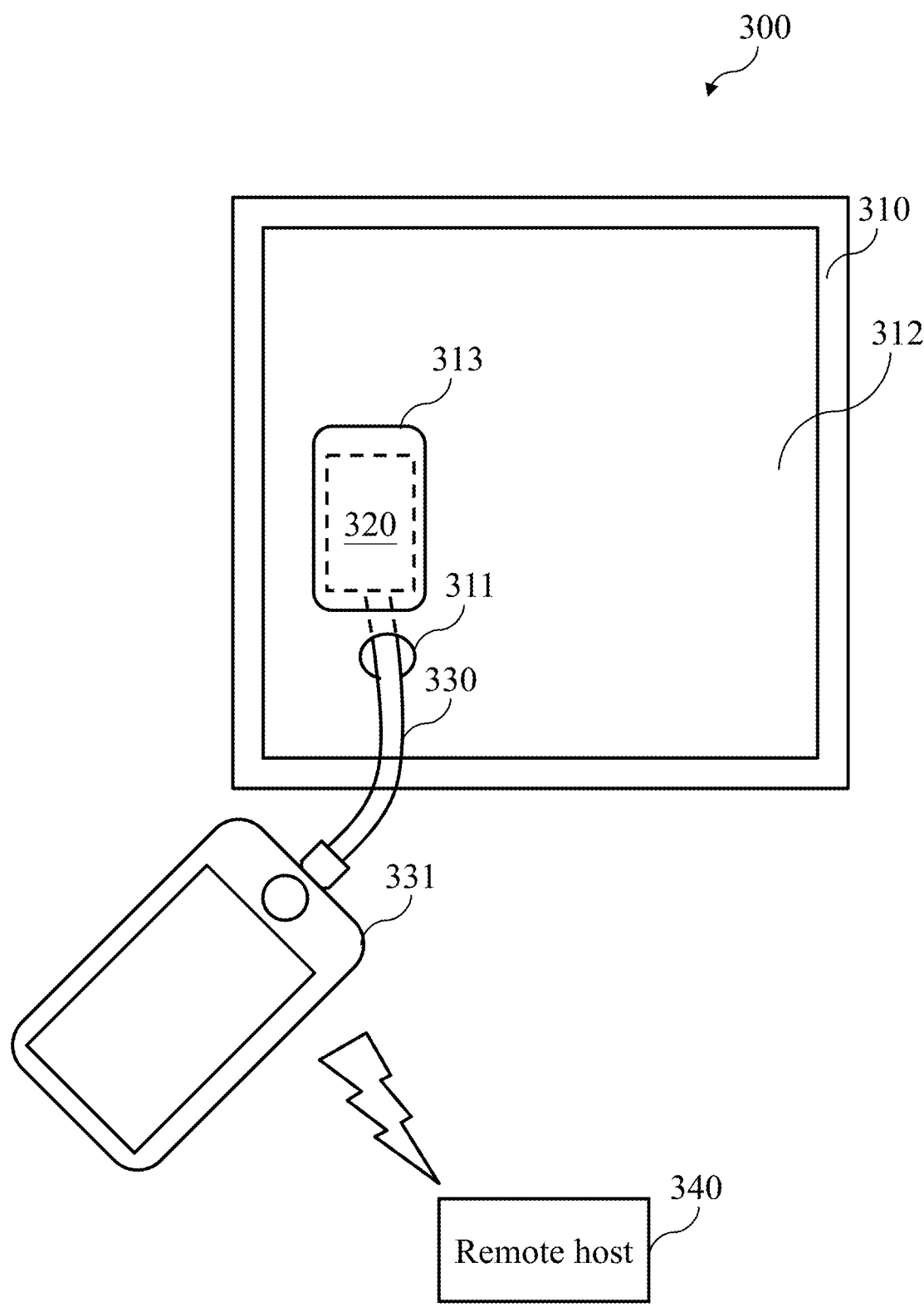
FIG. 3 is a schematic view of an operation of accessing a locker, according to an application of the present invention.

The embodiment of the present invention will be explained with reference to FIG. 3 and FIG. 4. Please refer to FIG. 3. FIG. 3 is a schematic view of an operation of accessing a locker, according to an application of the present invention. In actual implementation, for placing or retrieving items, the fundamental requirement is to open the designated locker 300. Therefore, in practice, the remote host 340 is the entity that determines whether the locker 110 can be unlocked. For placing items, after a placer logs into the remote host 340 to request the use of the locker 110 through a mobile application, the remote host 120 sends the designated compartment message to a smartphone 331 of the placer via network or text message, that is, the remote host 120 selects or designates an available locker 300 for the placer; for example, when multiple idle lockers exist, the remote host 120 can randomly select one of the available lockers 300 for the placer or select a suitable locker based on the placer's location, height, or the size of the items to be stored. For example, when the placer is shorter, the remote host 120 can select a lower-positioned locker for the placer; for example, based on the predefined layout of the locker or under the premise of knowing the item dimensions, the remote host 120 can make selection based on the maximum capacities of the available lockers. The smartphone 331 is electrically connected to the locker 300 through the transmission line 330 passing through the through hole 311, at this time, the smartphone 331 supplies power to the locker 300, reads the unique identification code from the motherboard 320 of the locker 300, and transmits the read unique identification code and identification message to the remote host 340 through a network. The remote host 340 verifies the user identity based on the received unique identification code and the identification message, when the user identity is valid, the remote host generates and transmits the trigger signal to the smartphone 331. Next, the smartphone 331 can trigger the electronic door lock 313 based on the received trigger signal to switch the state of the electronic door lock 313 to the unlocked state from the locked state. At this time, the placer can open the door panel 312 and place items into the cabinet 310. After placing the items, the placer closes the door panel 312 onto the cabinet 310 and removes the transmission line 330, and the electronic door lock 313 then automatically locks. Therefore, the item-placing process is completed. It is particularly noted that, in actual implementation, after receiving the trigger signal, the smartphone 331 can store the trigger signal therein and later trigger transmission via the mobile application on the smartphone 331 when needed, thereby transmitting the trigger signal to the locker 300 through the transmission line 330. Alternatively, a two-dimensional barcode for unlocking can be generated based on the trigger signal, and then displayed on the screen of the smartphone 331 or printed directly for scanning by a scanning device connected to the locker 300, thereby triggering the electronic door lock 313 of the locker 300. In other words, the above-mentioned trigger signal does not need to be transmitted in real-time and can even be generated as the two-dimensional barcode for scanning in case of transmission failure or continuously transmitted until successful, in this way, it can prevent unlocking failure due to poor network or connection conditions.

The item retrieval is taken as an example, and the overall process is similar to placing items. The remote host 120 also transmits a designated compartment message to the smartphone of a retriever via network or text message, the designated compartment message specifies the locker 300 where the item is placed. Similarly, when the smartphone is electrically connected to the designated locker 300 through the transmission line 330 passing through the through hole 311, the smartphone supplies power to the locker 300, reads the unique identification code from the motherboard 320 of the locker 300, transmits the read unique identification code and identification message to the remote host 340 through a network. In this way, the remote host 340 can determine whether the locker 110 connected to the smartphone is the designated locker 300, based on the unique identification code, and also confirm the identity of the retriever based on the identification message (such as a cellphone number or login information). When the identity is verified correctly, the remote host 340 generates and transmits a trigger signal to the smartphone, the smartphone transmits the received the trigger signal to the locker 300 via the transmission line 113, thereby driving the electronic door lock 313 to switch to the unlocked state from the locked state. At this point, the retriever can successfully retrieve the item from the designated locker 300. Similarly, after retrieving the item, the retriever closes the door panel 312 onto the cabinet 310 and removes the transmission line 330, and the electronic door lock 313 then automatically locks. Therefore, the retrieval process is then completed. It should be supplemented that the above-mentioned embodiment using the transmission line 330 passing through the through hole 311 is merely an example, and the present invention is not limited thereto; any manner of electrically connecting the motherboard 320 with the transmission line 330 are within the scope of the present invention.

Figure 4:
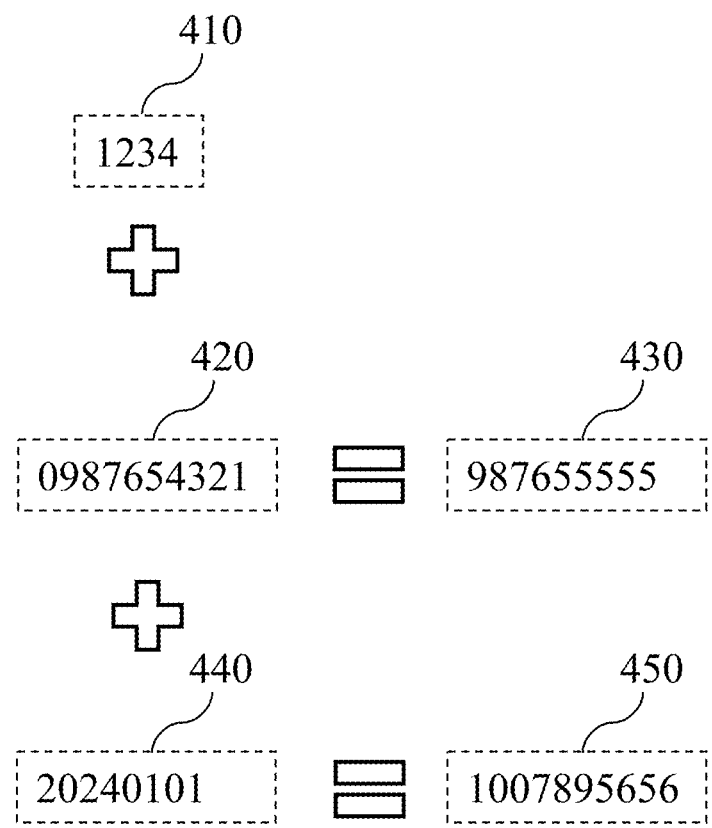
FIG. 4 is a schematic view of an operation of confirming whether a user identity is valid, according to an application of the present invention.

Please refer to FIG. 4. FIG. 4 is a schematic view of an operation of confirming whether user identity is valid, according to an application of the present invention. In actual implementation, for the portable device to transmit the read unique identification code and the identification message to the remote host 120 through a network, in addition to transmitting them separately, the portable device can also perform calculation on the read unique identification code and the identification message and then transmit the calculated value to the remote host 120. For example, the mobile application of the portable device can add the unique identification code 410 read from the locker 110 with its own cellphone number 420 to obtain s calculated value 430, and then transmit the calculated value 430 to the remote host 120. When the remote host 120 verifies whether the user identity is valid, since the user's cellphone number and the designated locker are known message, the remote host 120 can subtract the cellphone number from the calculated value to determine whether the calculated value matches the designated locker (i.e., whether the user identity is valid). For example, when the value corresponding to the designated locker is 123, and the calculated value minus the cellphone number also results in 123, then both are considered matching, and it indicates that the user identity is valid. In this way, under the condition that third parties do not know the computational rules, the confidentiality of the unique identification code and the identification message can be ensured, because the unique identification code and the identification message are not transmitted in plaintext over the network. Besides, a time stamp 440 can be incorporated into the above-mentioned computation, for example, the unique identification code 410, the cellphone number 420, and the time stamp 440 are added together to obtain the calculated value 450. In this way, during the verification process, the remote host 120 can also confirm timeliness during the authentication period. It is particularly noted that the present invention has been explained using the above computational example, but the present invention is not limited to this example, any computation combining the unique identification code and the identification message falls within the scope of this invention, for example, incorporating a password into the computation.

In summary, the difference between the present invention and the conventional technology is that, in the present invention, the portable device reads the unique identification code of the locker 110, and then transmits the unique identification code and its own identification message to the remote host 120, the remote host 120 verifies whether the user identity matches the designated locker; when the user identity matches the locker, the remote host 120 generates and transmits the trigger signal to the portable device through the transmission line 113, so that the portable device triggers the electronic door lock of the locker to enter the unlocked state from the locked state. With the above-mentioned solution, the present invention can achieve the technical effect of reducing the cost and setup limitations of a smart locker.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. An access system for a smart locker, comprising:
a plurality of lockers, wherein each of the plurality of lockers comprises:
  a cabinet having a door panel that allows opening and closing;
  an electronic door lock disposed on the door panel, wherein the electronic door lock is in a locked state when the electronic door lock is not powered and the door panel is closed;
  a motherboard disposed in the cabinet and having a unique identification code, and electrically connected to the electronic door lock through a conductive wire; and
  a transmission line electrically connected to the motherboard, and configured to electrically connect to a portable device, wherein when electrically connected to the portable device, the portable device reads the unique identification code for transmission through a network, and the transmission line receives a trigger signal from the portable device to drive the electronic door lock to switch to an unlocked state from the locked state; and a remote host, comprising:
  a non-transitory computer readable media, configured to store computer-readable instructions; and
  a hardware processor, electrically connected to the non-transitory computer readable media, configured to execute the computer-readable instructions to make the hardware processor execute:
    transmitting a designated compartment message to the portable device;
    when the portable device is electrically connected to the locker, receiving the unique identification code and an identification message transmitted by the portable device through a network; and
    verifying a user identity based on the unique identification code and the identification message, and when the user identity is valid, generating and transmitting the trigger signal to the portable device to enable the portable device to trigger the electronic door lock to unlock the locker based on the trigger signal.

2. The access system for smart locker according to claim 1, further comprising an automatic return hinge disposed between the door panel and the cabinet, so that the door panel is automatically closed onto the cabinet when no force is applied.

3. The access system for smart locker according to claim 1, wherein the remote host generates an authorization message based on the designated compartment message and a cellphone number of the portable device, and transmits the authorization message to the portable device, and when the authorization message matches the portable device and the locker electrically connected to the portable device, the portable device is authorized to transmit the read unique identification code and identification message to the remote host through a network.

4. The access system for smart locker according to claim 1, wherein the identification message comprises at least one of an identification number, a cellphone number, an email address, and other message with uniqueness and identifiability, and when the remote host detects the same portable device repeatedly transmits the same unique identification code and identification message within a predetermined time segment, the remote host allows the regeneration of the trigger signal, and when it exceeds the time segment, the remote host prohibits generation of the trigger signal until the locker is unlocked by another portable device.

5. The access system for smart locker according to claim 1, wherein the portable device performs vectorization and four arithmetic operations on the read unique identification code and the identification message to generate a calculated value, and the remote host verifies whether the user identity is valid based on the calculated value.

6. An access method for a smart locker, comprising:
  providing a plurality of lockers, wherein each of the plurality of lockers comprises a cabinet, a motherboard, and a transmission line, the cabinet has a door panel that allows opening and closing, and an electronic door lock disposed on the door panel, the electronic door lock is in a locked state when the electronic door lock is not powered and the door panel is closed, the motherboard has a unique identification code and electrically connected to the electronic door lock through a conductive wire;
  transmitting a designated compartment message to a portable device, by a remote host;
  when the portable device is electrically connected to the locker through a transmission line, reading the unique identification code from the locker, and transmitting the read unique identification code and identification message to the remote host through a network, by the connected portable device;
  verifying the user identity based on the received unique identification code and the identification message, and when the user identity is valid, generating and transmitting a trigger signal to the portable device, by the remote host; and
  triggering the electronic door lock based on the received trigger signal to switch the state of the portable device from the locked state to an unlocked state, by the portable device.

7. The access method for smart locker according to claim 6, further comprising:
  disposing an automatic return hinge between the door panel and the cabinet, so that the door panel is automatically closed onto the cabinet when no force is applied.

8. The access method for smart locker according to claim 6, wherein the remote host generates an authorization message based on the designated compartment message and a cellphone number of the portable device, and transmits the authorization message to the portable device, and when the authorization message matches the portable device and the locker electrically connected to the portable device, the portable device is authorized to transmit the read unique identification code and identification message to the remote host through a network.

9. The access method for smart locker according to claim 6, wherein the identification message comprises at least one of an identification number, a cellphone number, an email address, and other message with uniqueness and identifiability, and when the remote host detects the same portable device repeatedly transmits the same unique identification code and identification message within a predetermined time segment, the remote host allows the regeneration of the trigger signal, and when it exceeds the time segment, the remote host prohibits generation of the trigger signal until the locker is unlocked by another portable device.

10. The access method for smart locker according to claim 6, wherein the portable device performs vectorization and four arithmetic operations on the read unique identification code and the identification message to generate a calculated value, and the remote host verifies whether the user identity is valid based on the calculated value.

* * * * *